Sept. 8, 1964 C. H. VAN HARTESVELDT ETAL 3,148,269
HEATER FOR CONTINUOUS MOLDING MACHINE
Filed Aug. 22, 1962
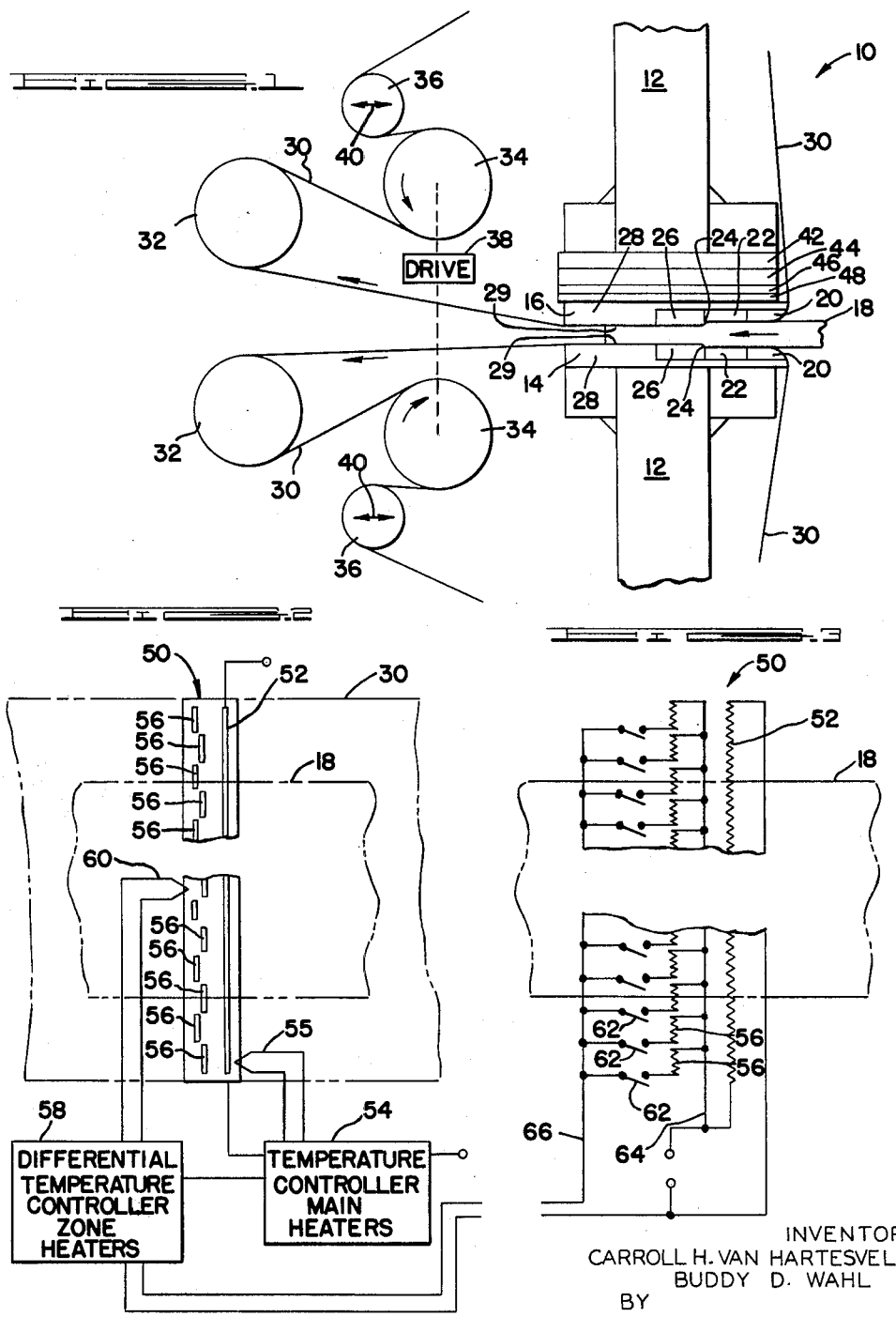
INVENTORS
CARROLL H. VAN HARTESVELDT
BUDDY D. WAHL
BY
OLSEN AND STEPHENSON
ATTORNEYS

United States Patent Office 3,148,269
Patented Sept. 8, 1964

3,148,269
HEATER FOR CONTINUOUS MOLDING
MACHINE
Carroll H. Van Hartesveldt and Buddy D. Wahl, Toledo,
Ohio, assignors to Hoover Ball and Bearing Company,
Saline, Mich., a corporation of Michigan
Filed Aug. 22, 1962, Ser. No. 218,761
8 Claims. (Cl. 219—243)

The present invention relates to improvements in a continuous molding machine for forming workpieces, such as laminated plastic surface boards, case hardened wooden boards and similar articles, and is particularly concerned with improvements in the heating means in such machines. In particular, the present invention is adapted for use with continuous molding machines of the type disclosed in copending application Serial No. 70,498, filed November 21, 1960.

In machines of the type disclosed in the aforesaid copending application, a pair of endless sheet metal belts are used, between which belts workpieces are pulled through two opposed or inwardly facing shoes or platens. The shoes or platens apply pressure and heat to the workpieces. This is accomplished by opposite complementary preheating sections, inwardly converging or sloping compression sections and final curing sections in the shoes or platens, through which sections workpieces are successively and continuously moved.

One of the problems that may occur when using a machine of this character arises when it is desired to pass through the machine workpieces of somewhat narrower width than the shoes and associated belts of the machine. When so used, thermal stresses are introduced into the sheet metal belt beyond those that would normally occur when forming workpieces having a full width of the shoes or belt. In the latter instance, the belt is essentially at constant temperature and very little, if any, thermal distortion stress is present.

It has heretofore been the practice to provide uniform transverse heating where required in the preheating and curing sections. This heating arrangement creates no problem when workpieces are being formed which are of the same width as the belts, but where smaller workpieces are being formed, the converse is true. In the latter case it is found that the workpieces absorb a substantial amount of the heat from the heaters in the shoes, and therefore, as the temperature of the belts in this region is thermostatically held to the required level, the temperature will cumulatively rise excessively in the region where no workpieces contact the belts. Where the temperature of the belts is higher, a different thermal expansion of the belts occur in the one region adjacent to the other, thereby creating longitudinal shear stresses in the belts along lines on opposite sides or edges of the workpieces.

It is recognized that not all such longitudinal shear stresses can be completely eliminated, but it is an object of the present invention to provide a continuous molding machine of the foregoing character which is constructed and arranged so as to reduce to a minimum the longitudinal shear stresses that can result from differential thermal expansion in the endless sheet metal belts of the machine when forming workpieces of less width than the width of the belts.

It is another object of the present invention to provide an improved heating means for use in a continuous molding machine of the foregoing character which heating means is constructed and arranged to reduce to a minimum the thermal stresses that occur in the endless belts of the molding machine.

It is still another object of the present invention to provide an improved heating means for use in the shoes of a molding machine of the foregoing character whereby only the minimum heat required to preheat and cure the workpieces are transmitted to the belts. In this respect, it is another problem when employing prior art machines of the foregoing character to avoid overheating the bearings associated with the endless belts. It will be understood that if excessive heat is transmitted through the bearing surfaces to the belts, this excessive heat will increase the normal problems associated with lubricating such bearings so as to provide low wear and a low coefficient of friction.

It is still another object of the present invention to provide an improved heating means for a continuous molding machine, which means is constructed and arranged to facilitate adjusting the effective width of heating of such means so that the continuous molding machine can be used most effectively with workpieces of various widths.

It is still another object of the present invention to provide improved heating means of the foregoing character which is constructed to operate automatically in maintaining all portions across the full width of the belts of a continuous molding machine at the minimum temperature differential.

Other objects of this invention will appear in the following description and appended claims, reference being had to the accompanying drawings forming a part of this specification wherein like reference characters designate corresponding parts in the several views.

In the drawings:

FIGURE 1 is a fragmentary side elevational view shown somewhat in schematic form of a machine embodying the principles of the present invention;

FIGURE 2 is a diagrammatic view of a portion of the electrical circuit for operating the heaters in the shoes of the machine illustrated in FIGURE 1; and FIGURE 3 is a more detailed diagrammatic view of portions of the electrical circuit illustrated in FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. As shown in FIGURE 1, the continuous molding machine 10 has frame members 12 between which are mounted the opposed shoes 14 and 16. A workpiece 18 is adapted to be passed between the shoes 14 and 16 in the direction of the indicating arrow shown in the workpiece 18. The shoes 14 and 16 initially have extensions 20, followed successively by the preheated sections 22, the pressure steps 24, the curing sections 26 and the cooling sections 28. The workpiece 18 is suitably forced between the shoes 14 and 16 by being carried frictionally between the opposed endless thin sheet metal belts 30. These sheet metal belts are drawn over the bearing surfaces 29 affixed to the shoes 14 and 16 to draw the workpiece frictionally with them. The preheated sections 22 are formed having heating elements therein of the type to be described, and the curing sections 26 have similarly constructed heating elements, but which are normally operated at a higher temperature than the heating elements in the preheated sections 22.

The sheet metal belts 30 are carried by the frames 12 and the belts are supported on rollers, and each of these frames and rollers are substantially identical in construction. The belts 30 successively pass around rollers 32, 34, 36 and other rollers not shown but which function to provide an endless drive arrangement for the belts 30. The rollers 34 are driven by a suitable drive 38 and the rollers 36 are shiftable to provide tension in the belts 30, as indicated by the arrowed lines 40. The space between the shoes 14 and 16 is controlled by selecting the desired size and number of removable blocks 42, 44, 46 and 48. Suitable adjustment means, not shown, are provided for rigidly securing the shoes 14 and 16 and the removable blocks 42, 44, 46, 48 in place. For a more detailed description of the general construction of the machine 10, reference is made to the aforesaid copending application Serial No. 70,498.

In the normal operation of the machine 10, the width of the shoes 14 and 16 and the belts 30 will be approximately the same, and normally workpieces having this same general width will be formed in this machine. However, in order to provide greater utility of the machine 10, it is desirable to be able to form workpieces having lesser width than that of the belt and shoes. As previously described, the machine can be used for making workpieces of lesser widths, but this creates certain problems in connection with the heating system which tend to place unnecessary and undesirable longitudinal shear stresses on the belts 30 and which also may cause excessive heating of the belts 30 and the bearing surfaces 29, thereby tending to overheat other parts of the machine, such as the heating elements and the like.

Referring now to FIGURES 2 and 3, a more detailed description will be provided of an improved heating system adapted to be used in both the preheat blocks or sections 22 and the curing blocks or sections 26. Referring first to FIGURE 2, the belt 30 is shown in broken lines and a workpiece 18 of less width than the belt is also shown in broken lines. Extending across the full width of the belt 30 is heating unit 50 which has a main heating element 52 of substantially the same width as the heating unit 50. A temperature controller 54 for the main heating element 52 is electrically connected with the latter and has a thermocouple 55 positioned in the shoe adjacent to the belt 30 and near one side thereof. By virtue of this arrangement, the main heater 52 is operative to heat the full width of the belt 30 and the temperature controller 54 will cause the heating element 52 to be energized whenever the temperature at the belt 30 is below a preselected temperature. The heating unit 50 also includes a plurality of zone heaters 56, and a differential temperature controller 58 is provided for controlling the operation of the zone heaters 56. This is accomplished by an electric circuit which includes a thermocouple 60 located in the shoe adjacent the surface of the belt 30 and normally positioned centrally of the intended path of travel of the workpiece 18. As can be seen best in FIGURE 3, the zone heaters 56 are in electrical parallel with one another, and each has a switch 62 which when closed will place the particular zone heater 56 in an electrical circuit for energizing such zone heater.

In the normal operation of the machine 10, when it is intended to form a series of workpieces 18 of lesser width than the belt 30, switches 62 for the zone heaters 56 which are within the lateral confines of the intended path of travel of the workpieces 18, will be closed, and the switches 62 for the zone heaters 56 outside the confines of the intended path of travel of the workpieces will be open. Thus, all of the switches 62, illustrated in FIGURE 3, would be closed with the exception of the three switches 62 in extreme opposite ends of the heating unit 50. The differential temperature controller 58 will be adjusted so that the thermocouple 60 will close the circuit through the conductors 64 and 66 when the temperature is a preselected degree below that maintained by controller 54. By this arrangement, the zone heaters 56 will function to maintain the desired heat necessary to preheat and cure the workpiece 18, and the zone heaters outside the lateral confines of the workpieces 18 will be inoperative, and therefore, will not needlessly heat portions of the belt 30.

By the heating system disclosed, the total heating in the preheated and curing sections is done with two separate circuits. One circuit, which includes the main heater, is controlled by a thermocouple in the platen or shoe a short distance from the outer edge of the associated belts 30. This main heater extends the entire width of the shoes or belts. The zone heaters are individual resistance units which are installed in sufficient numbers to extend the full width of the shoes or belts. However, each of the zone heaters 56 has a separate switch 62 so that such zone heaters may be selectively disconnected. The thermocouple 60 controlling the zone heaters 56 is located near the center of the shoes. When material narrower than the full width of the machine is run, the zone heaters outside the material are disconnected by suitable equipment such as is schematically diagrammed. The zone heater area is controlled at a temperature of about 5° F. below the temperature at which the main heater is controlled. Consequently, the main heater will supply any heat required by the belt and all general heat losses. As soon as material starts through the machine, the temperature in the zone heater area will drop. As soon as this temperature is below the differential temperature controller setting, the zone heaters 56 which have their switches 62 closed, will be energized to heat the width of the material being passed through the machine. The zone heaters 56 will then be turned on and off to maintain the temperature required in the central section or within the lateral confines of the path of travel of the workpieces. The main heater 52 will automatically turn on and off to maintain the normal temperature outside the lateral confines of the workpieces, and the heat it supplies within such lateral confines reduces the heat required from the zone heaters 56.

Thus, it can be seen that a heating system is provided which will maintain a substantially uniform temperature across the full width of the belts, and there will be no excessive heating of the belts or bearing surfaces outside of the areas in contact with the workpieces. Under these conditions longitudinal shear forces in the belts will be kept at a minimum and there will be very little excessive heat in any component outboard of the workpiece. It will also be understood that the present invention will reduce to a minimum the cost of supplying electric current to the machine when making workpieces of smaller sizes than those of full width capacity of the machine.

Having thus described our invention, we claim:

1. A continuous molding machine for forming workpieces of various widths, such as laminated surface boards, case hardened wooden boards and the like, wherein said machine includes first means of pre-established width for uniformly applying pressure and heat to a surface of a workpiece of lesser width than said pre-established width, and second means for relatively moving the workpiece in a path through said first means, the heat applying means of said first means including a first temperature sensitive control means and a first heating element responsive thereto for heating the full width of said first means in response to temperature conditions detected by said first control means in said first means at a location displaced laterally away from the lateral confines of the path of movement of said workpiece, and a second temperature sensitive control means and a second heating element for heating only those portions of said first means substantially within the lateral confines of the path of movement of said workpiece, said second heating element heating the intended portions of said first means in response to a predetermined temperature condition detected by said second control means at a location in said first means within the lateral confines of the path of movement of said workpiece.

2. In a continuous molding machine for forming workpieces of various widths, such as laminated surface boards, case hardened wooden boards and the like, wherein said machine includes means for uniformly applying a pressure to a surface of a workpiece and means for relatively moving the workpiece in a path past said pressure applying means, the improvement which comprises heating means for applying heat to said workpiece at controlled temperatures in an area extending transversely of the path of movement of said workpiece, said heating means comprising a main heater having a longitudinal axis in close proximity to said path and in generally transverse relationship therewith, first temperature control means for activating said main heater when the temperature at a selected point in said path near the edge of the latter is below a preselected temperature, a secondary heater having a transverse axis in close proximity to said path and said main heater and having means operable for selectively varying its effective transverse dimension to correspond generally to the width of said workpiece, and second temperature control means for activating said secondary heater when the temperature of said path within the limits of said effective transverse dimension is below a preselected temperature.

3. In a continuous molding machine for forming workpieces of various widths, such as laminated surface boards, case hardened wooden boards and the like, wherein said machine includes a shoe member having a leading preheat surface, an inclined surface for applying a compression force and a curing surface, and an endless belt of the width of said shoe and movable in a path for translating said workpieces past said shoe, the improvement which comprises heating means in the preheating portion of said shoe, said heating means comprising a main heater extending transversely in said shoe for substantially the full width thereof, first temperature control means for activating said main heater when the temperature in said shoe adjacent to one side thereof is below a preselected temperature, a secondary heater extending transversely in said shoe for substantially the full width thereof and having means operable for varying selectively the effective transverse dimension thereof to correspond generally to the width of the workpieces translated by said belt, and second temperature control means for activating said secondary heater when the temperature in said shoe within the width of travel of the workpieces is below a preselected temperature.

4. In a continuous molding machine for forming workpieces of various widths, such as laminated surface boards, case hardened wooden boards and the like, wherein said machine includes a shoe member having a leading preheat surface, an inclined surface for applying a compression force and a curing surface, and an endless belt of the width of said shoe and movable in a path, the improvement which comprises heating means in the curing portion of said shoe, said heating means comprising a main heater extending transversely in said shoe for substantially the full width thereof, first temperature control means for activating said main heater when the temperature in said shoe adjacent to one side thereof is below a preselected temperature, a secondary heater extending transversely in said shoe for substantially the full width thereof and having means operable for varying selectively the effective transverse dimension thereof to correspond generally to the width of the workpieces translated by said belt, and second temperature control means for activating said secondary heater when the temperature in said shoe within the width of travel of the workpieces is below a preselected temperature.

5. In a continuous molding machine for forming workpieces of various widths, such as laminated surface boards, case hardened wooden boards and the like, wherein said machine includes a shoe member having a leading preheat surface, an inclined surface for applying a compression force and a curing surface, and an endless belt of the width of said shoe and movable in a path, the improvement which comprises heating means in each of the preheating portion and the curing portion of said shoe, each of said heating means comprising a main heater extending transversely in said shoe for substantially the full width thereof, first temperature control means for activating said main heater when the temperature in said shoe adjacent to one side thereof is below a preselected temperature, a secondary heater extending transversely in said shoe for substantially the full width thereof and having means operable for varying selectively the effective transverse dimension thereof to correspond generally to the width of the workpieces translated by said belt, and second temperature control means for activating said secondary heater when the temperature in said shoe within the width of travel of the workpieces is below a preselected temperature.

6. A continuous molding machine for forming workpieces of various widths, such as laminated surface boards, case hardened wooden boards and the like, wherein said machine includes first means of pre-established width for uniformly applying pressure and heat to a surface of a workpiece equal to or of lesser width than said pre-established width and second means for relatively moving the workpiece past said first means, the heat applying means of said first means comprising a main electric resistance heater substantially equal in width to said pre-established width, first control means for energizing said main heater when the temperature at one side of said first means is below a preselected temperature, a secondary heater including a series of zone electric resistance heaters arranged across said pre-established width, switch means for selectively opening or closing said zone heaters, and second control means for energizing the closed zone heaters in response to a preselected temperature condition within the lateral confines of the path of movement of said workpiece.

7. A continuous molding machine for forming workpieces of various widths, such as laminated surface boards, case hardened wooden boards and the like, comprising first means of pre-established width for uniformly applying pressure and heat to a surface of a workpiece of lesser width than said pre-established width, and second means including an endless metal belt substantially equal in width to said pre-established width for relatively moving the workpiece through said first means, the heat applying means of said first means including a first temperature sensitive control means and a first heating element responsive thereto for heating the full width of said first means in response to a predetermined temperature condition in said first means detected by said first control means at a location adjacent to one edge of said endless metal belt, and a second temperature sensitive control means and an adjustable second heating element of selectable variable effective width responsive to the second control means for heating the portion of said first means corresponding to the width of said workpiece in response to a predetermined temperature condition in said first means detected by said second control means at a location adjacent to said belt and within the selected effective heating width of said second heating element.

8. A continuous molding machine for forming workpieces of various widths, such as laminated surface boards, case hardened wooden boards and the like, comprising first means of pre-established width for uniformly applying pressure and heat to a surface of a workpiece of either equal width or lesser width than said pre-established width, and a second means including an endless metal belt substantially equal in width to said pre-established width for relatively moving the workpiece through said first means, the heat applying means of said first means including an electrical heating element and first electrical controls therefor for heating the full width of said first means in response to a temperature below a first predetermined value in said first means at a location adjacent to one edge of said endless metal belt, and a second heating element of selectable variable effective width and second electrical controls therefor for heating a portion of said first means corresponding in width to the width of said workpiece in response to a temperature below a second predetermined value in said first means at a location adjacent to said endless metal belt and within said effective width of the second heating element, said first electrical controls being responsive to a higher temperature than said second electrical controls.

References Cited in the file of this patent
UNITED STATES PATENTS

| | | |
|---|---|---|
| 2,556,008 | Spalding | June 5, 1951 |
| 2,800,162 | Rohdin | July 23, 1957 |